(No Model.)
G. WILSON.
VISE OR CRAMP FOR HOLDING BITS OR OTHER PARTS OF HARNESS WHILE BEING CLEANED.
No. 551,483.   Patented Dec. 17, 1895.
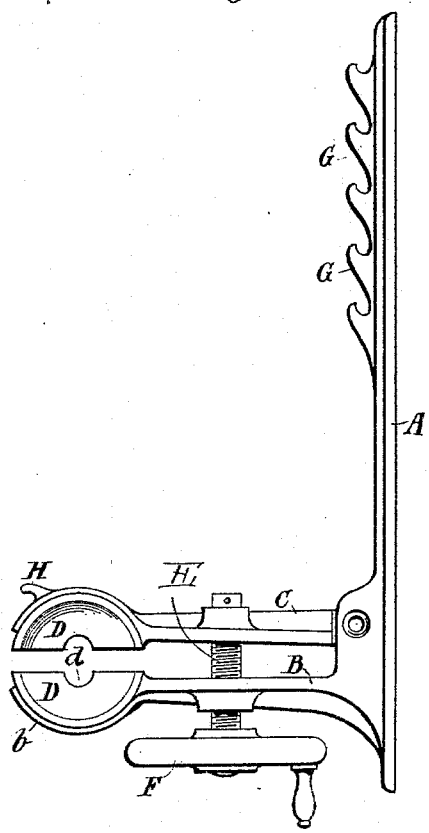
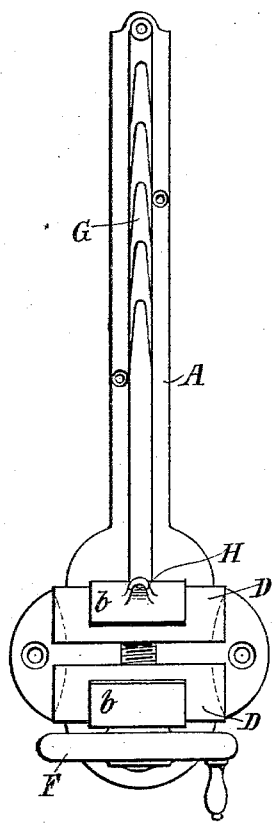
Witnesses
H. van Oldenneel
E. A. Scott
Inventor
George Wilson
by Richards
Attorneys

UNITED STATES PATENT OFFICE.

GEORGE WILSON, OF SHEFFIELD, ENGLAND.

VISE OR CRAMP FOR HOLDING BITS OR OTHER PARTS OF HARNESS WHILE BEING CLEANED.

SPECIFICATION forming part of Letters Patent No. 551,483, dated December 17, 1895.

Application filed July 15, 1895. Serial No. 556,080. (No model.) Patented in England March 30, 1894, No. 6,399.

*To all whom it may concern:*

Be it known that I, GEORGE WILSON, a subject of the Queen of Great Britain, and a resident of Sheffield, in the county of York, England, have invented a certain new and useful Improved Vise or Cramp for Holding Bits and other Parts of Harness while Being Cleaned, (for which I have obtained a patent in Great Britain, No. 6,399, dated March 30, 1894;) and I do hereby declare that the following is a full, clear, and exact description thereof, reference being had to the accompanying drawings, which form a part of this specification.

Hitherto such articles as bits, stirrups, and the like have been held in any way that suggested itself to the man.

I construct a special appliance for the purpose and I have illustrated it in the annexed sheet of drawings, in which—

Figure 1 represents a side elevation of my improved appliance; Fig. 2, a front elevation of same.

I construct a back plate or bracket A, by which the appliance is secured to a wall, beam or any other suitable place, and which may therefore be varied in form to suit various positions. This part A is made with, or has affixed to it, a projecting arm B, having its outer end *b* curved to part of a circle, and either above or below, but preferably above, as shown, I arrange another arm C, pin-jointed to the plate or bracket A, so as to be capable of being raised and lowered. Its outer end corresponds with that of B. These curved ends are to receive the wood jaws D, of semi-cylindrical form, and having a longitudinal groove *d* made through them and also having their ends dished or hollowed, as indicated.

The jaws are opened and closed upon the object placed between them by means of a screw E, provided with a hand-wheel F, but a cam or other device for closing the jaws may be substituted for the screw.

Upon the bracket A, I construct a rack or series of hooks G, and upon the pivoted arm C, I have a reversed hook H, which used together form a means of stretching and holding parts of harness while being cleaned.

When the vise has to be fixed to the under side of a beam across a ceiling, for example, the upper part of A with the rack G may be omitted.

Having now particularly described my invention and the manner in which it is effectively carried into practice, what I wish to claim is—

1. In combination in a clamp, a back plate having a series of hooks, the clamping arms B, C, means for moving the arm C and the hook *h* on said arm, substantially as described.

2. In a vise for harness cleaning and other like purposes, the combination of two arms B, and C, provided with jaws D, closing screw E, or its equivalent, and a back support A, having a series of hooks G, as hereinbefore described and shown.

In testimony that I claim the foregoing as my own I have affixed hereto my signature, in presence of two witnesses, this 2d day of July, 1895.

GEORGE WILSON.

Witnesses:
ROBT. F. DRURY,
GILBERT N. DRURY.